Figure 1:
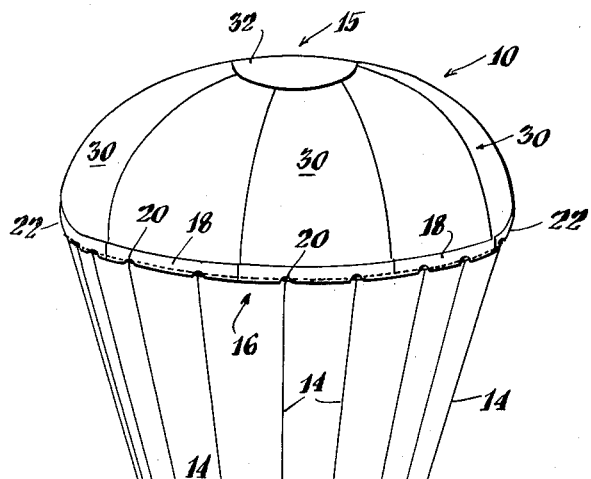

Jan. 10, 1956  L. P. FRIEDER ET AL  2,730,314
PARACHUTE CANOPY STRUCTURES
Filed Jan. 23, 1952

INVENTORS
*Leonard P. Frieder*
BY *Walter S. Finken*

Robert S. Dunham
ATTORNEY

United States Patent Office 2,730,314
Patented Jan. 10, 1956

2,730,314

PARACHUTE CANOPY STRUCTURES

Leonard P. Frieder, Great Neck, and Walter S. Finken, Brooklyn, N. Y.; said Finken assignor to said Frieder Application January 23, 1952, Serial No. 267,814

1 Claim. (Cl. 244—142)

This invention pertains to load-carrying canopies, and more particularly relates to a novel and improved parachute canopy structure in which the canopy has a preformed shape substantially the same as that generated by rotating a 90° arc of an ellipse about its minor axis, the 90° arc being one that extends from the major axis to the minor axis of the ellipse. Such a canopy will be often referred to herein as an ellipsoidal canopy.

Reference herein to the "preformed shape" of a canopy signifies that if properly supported (but without inflation), the canopy will assume the described special configuration even when there is essentially no tension in the fabric at any place.

The most widely used type of parachute (at least until very recently) has involved a so-called flat canopy, i. e. preformed to a flat shape. The assembly usually has a circular edge to which shroud lines are connected, for convergence to the point of load attachment. When such a canopy blooms in use, the downward pull of the shroud lines and the upward or inward force of air cup the fabric into a shallow, more or less parabolic shape.

More recently, use has been made of canopies preformed to a hemispherical shape, for example as described in the prior U. S. Patents No. 2,412,392, granted December 10, 1946, on the application of Walter S. Finken, and No. 2,426,926, granted September 2, 1942, on our application. Hemispherical canopies have been found specially advantageous, particularly in having much greater stability in flight than the older flat-type parachutes which have a strong tendency to oscillate during descent; hemispherical canopies also generally exhibit improved strength, especially against the sudden shock of opening at high speeds. Furthermore, in the case of a flat type canopy, large and unequal stresses are developed in the fabric to pull the canopy into the desired, shallow parabolic contour.

Another more recent type of canopy is the oblate spheroidal canopy, disclosed in our copending application, Serial No. 233,444, filed June 25, 1951, and which is preformed substantially in the shape of an intermediate zone of a sphere, surmounted by an oblate, inverted cup-shaped region having an altitude substantially less than the radius of its base. A canopy so shaped is in some ways markedly better than the hemispherical canopy, e. g. considerably less cloth is needed for a given retarding force, and a parachute having an oblate spheroidal canopy has faster opening characteristics than usually characterize the hemispherical canopy.

As pointed out in said copending application, such a canopy is useful in a so-called infinite load situation, e. g., for braking or slowing a fast-moving aircraft. Typically, such a situation involves the retarding of a spinning aircraft sufficiently so that the pilot may regain control. The fast opening characteristic just described is of particular utility in retarding a spin, since every fraction of a second saved in getting the parachute open increases the possiblity of saving the aircraft and the pilot.

The ellipsoidal canopy of the present invention not only requires less material than the oblate spheroidal canopy, i. e. less cloth is needed for a given retarding force, but also attains many of the same advantages possessed by the oblate spheroidal canopy over the hemispherical and/or flat canopies. For example, like the oblate spheroidal canopy, the ellipsoidal canopy is very fast in opening, considerably faster than the hemispherical canopy usually is.

As stated above, the ellipsoidal canopy is very economical of cloth, for a parachute of given capacity. Somewhat less fabric is needed than is the case with the oblate spheroidal canopy, and much less than is required to constitute a hemispherical canopy of the same load-carrying ability. Like both the hemispherical and the oblate spheroidal canopies, the structure of ellipsoidal shape is very stable in descent, i. e. it does not tend to oscillate very much if at all; furthermore, the ellipsoidal canopy is substantially free from undue or uneven or highly localized stresses and strains in the cloth.

For a given diameter and for the relatively smaller amount of cloth correspondingly needed, the device of the present invention produces a relatively powerful retarding effect, in considerable part because of a large low-pressure area which is produced above the crown in flight. In this connection, it is to be noted that the preformed ellipsoidal canopy, when based upon an ellipse having its minor axis about ¾ as long as its major axis, approximates the natural shape of a flat canopy when the latter is in descent. A still further advantage of the parachutes of this invention is that they are essentially simple and economical to manufacture.

Principal objects of the invention are to provide load-retarding canopies that attain the above-enumerated advantages, and generally to provide improved and more efficient parachute apparatus.

Figure 2:
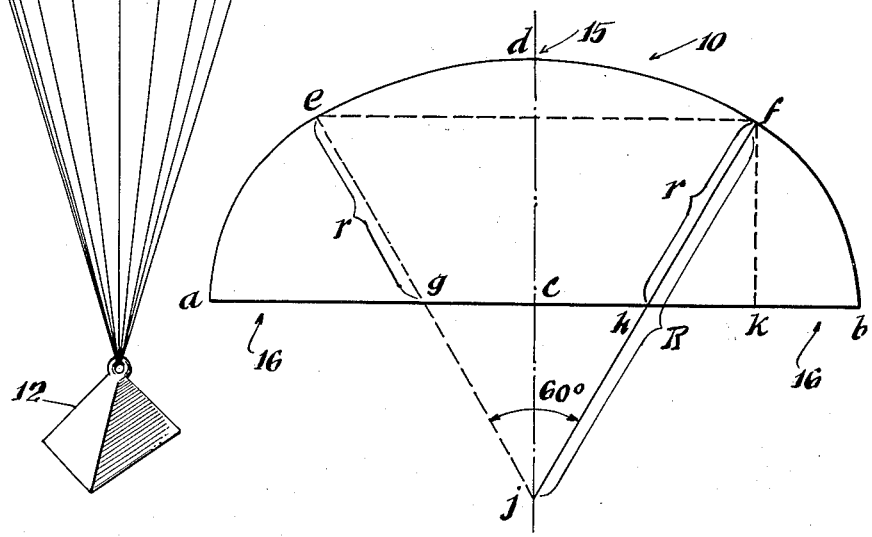

The above and other objects and advantages will appear more clearly from the following description, taken with the accompanying drawings in which:

Fig. 1 is a somewhat diagrammatic perspective view of an example of a parachute having the improved ellipsoidal canopy, shown in expanded form, as for support of a load; and Fig. 2 is a diagram showing the preformed canopy in vertical section, with certain geometric relationships.

Like reference numerals denote like parts in the various views.

Fig. 1 shows diagrammatically a parachute having an ellipsoidal canopy 10 in expanded form supporting a load 12 by means of a plurality of shroud lines 14. The canopy 10 has a crown 15 and a circular mouth or hem edge 16 circumferentially terminated by a hemmed sleeve 18 looped over a running cord; the hem cord, which is thus encased by the hem sleeve, may if desired, be bartacked at suitable localities to limit its movement relative to the hem. The sleeve 18 is provided with evenly spaced holes 20 (there being as many holes 20 as there are shroud lines 14), and the upper end of each shroud line 14 is passed through one of the holes 20 and looped around the hem cord, thus to connect the lines 14 to the canopy 10. Hem cord arrangements of this type are now well-known and need not here be described in greater detail.

The canopy 10 is composed essentially of flexible sheet material, preferably woven textile fabric. Its configuration, i. e. as an ellipsoidal canopy, can be best seen in and understood from Fig. 2, which is a diagram showing the preformed canopy in vertical section, i. e. in a section perpendicular to the mouth 16 and passing through the top or crown 15. In this section, the configuration of the canopy 10 is approximately that part of an ellipse which lies on one side of its major axis $ab$, and which has a depth equal to the semiminor axis $cd$ (i. e., half the minor axis of the ellipse). Thus the sectional outline is one-half of an ellipse as divided by its major axis, and the canopy 10 may be defined as having a preformed shape substantially the same as that generated by rotating about the minor axis of an ellipse, the 90° arc of such ellipse which extends from its major axis to its minor axis.

While other axis ratios will produce canopies realizing all or most of the above-enumerated advantages to a certain, useful extent, we at present prefer that the ratio of the minor axis to the major axis ab be about 3 to 4, or what is the same thing, that the ratio of semiminor axis cd to the semimajor axis cb be about 3 to 4, such being the ratio actually illustrated in the diagram of Fig. 2. It will be understood that canopies embodying the invention may be made in a great variety of sizes, depending on the type and use of the parachute desired. In each case the dimensions of the canopy will then correspond to the selected axis ratio; for example, a 20-foot canopy embodying the preferred structure of Fig. 2 has a mouth diameter ab of 20 feet and an altitude cd of 15 feet.

In practice, i. e. for design of the canopy and specifically for the ready determination of surface and other dimensions used in cutting the gores or other pieces of which the canopy is made, we prefer to approximate the elliptical arc adb as will now be described. A first circular arc edf of 60° is struck, having: (a) its linear (i. e. peripheral) center coinciding with the end d of the semiminor axis cd; (b) its center of curvature at j on the minor axis (extended below the major axis); and (c) its radius R equal to ⅔ the length of the major axis ab. Second and third circular arcs ea and fb are struck, having their respective centers of curvature at g and h on the major axis ab, and having radii r. Inherently, r will be ½ as long as R, and the arcs edf and ea will have a common tangent at e, and the arcs edf and fb will have a common tangent at f. Furthermore, the center of curvature g of the arc ea and the like center h of the arc fb will lie on lines je and jf, respectively, viz. the terminal radii of the arc edf. Mathematically, this construction provides a very close approximation to a true elliptical figure, and at the same time (in using circular arcs) permits simple determination of suitable surface and boundary dimensions for the component parts of a canopy of any desired size. Further relationships, determinable by simple trigonometry from the figure shown, are that the angles ega and fhb are each 60°, the distances cg and ch each equal to one-third of the equatorial radius (or semimajor axis) ca, the chord ef equal to two-thirds of the major axis (or equatorial diameter) ab, and the partial altitude kf equal to the value of the expression $r \sin 60°$.

It will now be appreciated that the preformed canopy 10 can be considered not only as being an ellipsoid (indeed substantially identical with a true ellipsoid), but also alternatively as having a central section substantially equal to a very shallow polar zone of a sphere and a peripheral section tangentially adjoining the lower or outer edge of the central section and curving outwardly and downwardly to the mouth opening 16 of the canopy 10 along a meridianal path of substantially sharper curvature than said central section. The peripheral section may be considered as an outer zone (e. g. only slightly less than the upper half of the outer surface) of a toroidal or quasitoroidal figure generated by revolution of a circle about a relatively short chord of such circle. In the sectional view of Fig. 2, the central section is represented by the arc edf and the body portion by the arcs ea and fb.

While, as stated, we at present greatly prefer that the ratio of the minor axis to the major axis of the ellipse be about 3/4 (in that a canopy so designed has unusual advantages in practical use), satisfactory results, i. e. retarding effect, stability, economy of cloth, and the like, may be had where such ratio is from as little as 3/8 to as much as 4/5. By following the type of geometrical construction method herein shown and described in which the ratio of 3/4 is used, it is apparent how ellipses having different ratios can be approximated, i. e. for corresponding convenience of dimensional determination if such mode of design is preferred to the use of a directly delineated ellipse.

A more generalized statement of one way of approximating an ellipse, i. e. a semi-ellipse as shown in Fig. 2, may be determined by the following equations wherein the dimensions of the various lines used for construction are to be ascertained from given values for the semimajor axis ac and the semiminor axis cd and wherein, as before, the arcs ae and bf are each a 60° circular arc of radius r and the arc edf is a 60° circular arc of radius R:

$$r = cd - \frac{ac - cd}{3} \quad (1)$$

$$gc = ch = ac - r \quad (2)$$

$$\frac{ef}{2} = r \cos 60° + gc = \frac{r}{2} + gc \quad (3)$$

$$R = \frac{\frac{ef}{2}}{\sin 30°} = ef \quad (4)$$

Although unusual results have been obtained with the preferred canopy having the minor to major axis ratio of 3/4, requirements may sometimes dictate other ratios, greater or less. For instance, limitations of packing space and weight for the folded parachute may demand a relatively smaller semiminor axis, i. e. so as to use less cloth. Thus in one general sense, the semimajor axis (and thus the effective diameter of the parachute) may be selected to provide the desired buoyancy or retarding force, while the semi-minor axis (or altitude) is chosen to suit the stowing requirements, usually being as large as the available space for the folded canopy will allow, the selected axis ratio being preferably within the range mentioned hereinabove. In some cases, useful canopies may have other minor-major axis ratios, e. g. even down to 1/4 or so.

As shown in Fig. 1, the preformed ellipsoidal canopy 10 may be conveniently constituted of a plurality of gores 30, appropriately cut to provide collectively a corresponding major zone of the surface including all of the peripheral section and a portion of the central section as dimensionally and proportionally defined in Fig. 2, while crown 15 of the canopy is closed by a relatively small circular crown piece 32 of fabric. It will be noted that in Fig. 1 the crown 15 is considerably smaller than the polar zone represented by edf in Fig. 2, and for smaller sizes of parachute, it may be satisfactorily fashioned of a single piece 32 as stated above; in some cases, as in larger canopies, the crown may be fashioned of a plurality of pieces, for example as shown in Figs. 4 and 5 of our cited copending application Serial No. 233,444, or in still larger canopies, as disclosed in Figs. 4, 6 and 12 of our application Serial No. 122,962, filed October 22, 1949, now U. S. Patent No. 2,693,924, for Parachute Canopy Structure. Particularly in the larger sizes, the crown 15 may thus be specially shaped to constitute in itself a distinctive part of the preformed surface as herein defined, convenience in such shaping being attained by considering the crown as a polar zone of a hemisphere. Indeed, if desired, the crown may in some cases constitute the entire zone defined by the arc edf in Fig. 2, with resulting further simplicity in dimensional and proportional design of the gores (arranged otherwise generally as in Fig. 1) then utilized to constitute the lower or body zone generated by the arc ae. With larger crowns 15, as stated above, a multiple piece structure is preferably employed, especially as shown in our cited application Serial No. 122,962, now U. S. Patent No. 2,693,924 of November 9, 1954.

It will also be understood that the gores 30 may themselves, in larger canopies, be composed of a plurality of pieces of fabric, in accordance with understood principles of parachute canopy construction. Finally, the canopy may in some cases advantageously embody fabric zones of differing porosity at differing localities, particularly for example a lowermost or equatorial zone (less than one-half of the zone $ae$) having a relatively very low porosity, an intermediate zone (such as the upper half of zone $ae$, but preferably somewhat further area above and below it) of considerably greater porosity, and a crown section of lower porosity than the intermediate zone, such crown section being constituted, if desired, by a double layer arrangement as also disclosed in our cited application Serial No. 122,962.

However assembled and arranged, the novel, preformed canopy structure of the present invention provides effective load-retarding action, as well as good opening characteristics from its folded, or otherwise collapsed condition of packing, and likewise an unusual economy of fabric relative to the results accomplished. Thus the canopy effectively achieves these and various other objects set forth above. To some special advantage, notably of stability, the parachute preferably is such that when fully deployed its hem region is pulled slightly inward as at 22 (Fig. 1) by the downward tension of the shroud lines; this slight but useful distortion of the expanded shape of the canopy is conveniently achieved by some permitted downward looping of the hem cord at the openings 20, and provides a slightly incurving shape, as indicated, from the true ellipsoidal configuration.

It is to be understood that the invention is not limited to the specific details herein shown and described, but may be embodied in other forms without departure from its spirit.

We claim:

An aircraft spin-retarding parachute canopy formed of sheet material and extending from a closed crown to a mouth opening adapted to be secured by shroud lines to a load, said canopy having, when unstressed, the contour of a semi-ellipsoid having the major axis of its generating ellipse in the plane of said mouth opening and having a semiminor axis substantially equal to three-fourths of the semimajor axis, said contour having a substantial and continuous curvature at all points along its intersection with any horizontal or vertical intersecting plane, said canopy material being substantially uniform throughout any horizontal cross-section through the canopy, whereby the canopy is cordless and ventless and stress due to said load is distributed uniformly throughout the canopy when the canopy is inflated.

References Cited in the file of this patent

UNITED STATES PATENTS

| 2,350,646 | Smith | June 6, 1944 |
| 2,505,954 | Frieder | May 2, 1950 |

FOREIGN PATENTS

| 149,418 | Great Britain | Aug. 10, 1920 |
| 474,019 | France | Oct. 29, 1914 |
| 617,903 | France | Nov. 30, 1926 |
| 678,946 | France | Jan. 2, 1930 |